(12) United States Patent
Tanoue et al.

(10) Patent No.: US 7,771,872 B2
(45) Date of Patent: Aug. 10, 2010

(54) SILVER OXIDE POWDER FOR ALKALINE BATTERY AND METHOD OF PRODUCING THE SAME

(75) Inventors: Koji Tanoue, Honjo (JP); Yoshiyuki Shoji, Okayama (JP)

(73) Assignee: Dowa Electronics Materials Co., Ltd., Tokyo (JP)

( * ) Notice: Subject to any disclaimer, the term of this patent is extended or adjusted under 35 U.S.C. 154(b) by 1428 days.

(21) Appl. No.: 11/165,227

(22) Filed: Jun. 24, 2005

(65) Prior Publication Data

US 2005/0266311 A1 Dec. 1, 2005

Related U.S. Application Data

(63) Continuation-in-part of application No. PCT/JP2004/001463, filed on Feb. 12, 2004.

(30) Foreign Application Priority Data

Feb. 13, 2003 (JP) .............................. 2003-034909

(51) Int. Cl.
*H01M 4/54* (2006.01)
*H01M 4/48* (2006.01)
*C01G 5/00* (2006.01)

(52) U.S. Cl. ..................... 429/219; 429/229; 429/206; 423/604

(58) Field of Classification Search .................. None
See application file for complete search history.

(56) References Cited

U.S. PATENT DOCUMENTS 4,792,505 A * 12/1988 Moyes ........................ 429/219
5,759,718 A * 6/1998 Yao et al. .................... 429/223
6,086,845 A * 7/2000 Kato et al. .................. 423/604
2003/0082450 A1 * 5/2003 Tanoue et al. ............... 429/219

FOREIGN PATENT DOCUMENTS

| JP | 53-44834 | 4/1978 |
| JP | 55-133765 | 10/1980 |
| JP | 56-149771 | 11/1981 |
| JP | 58-51470 | 3/1983 |
| JP | 59-167963 | 9/1984 |
| JP | 60-55 | 1/1985 |
| JP | 61-110964 | 5/1986 |
| JP | 61-136915 | 6/1986 |
| JP | 61-271747 | 12/1986 |
| JP | 2-12762 | 1/1990 |
| JP | 4-184867 | 7/1992 |

* cited by examiner

*Primary Examiner*—Dah-Wei Yuan
*Assistant Examiner*—Angela J. Martin
(74) *Attorney, Agent, or Firm*—Clark & Brody

(57) ABSTRACT

Alkaline battery silver oxide powder when soaked in a 50° C. KOH 40% aqueous solution for 24 hours experiences dissolution of Ag into the solution of 40 mg/L. Alkaline battery silver oxide powder exhibits substantially no Ag peak by X-ray diffraction even after soaking in a 50° C. KOH 40% aqueous solution for 72 hours. This powder has a crystallite size calculated from the half value breadth of the (111) plane peak by powder X-ray diffraction of greater than 250 Angstrom and equal to or less than 1000 Angstrom, particle diameter such that the average diameter of secondary particles is equal to or greater than 1 μm and equal to or less than 500 μm and that of primary particles forming the secondary particles is equal to or greater than 0.1 μm and equal to or less than 10.0 μm, and specific surface area of 5 $m^2/g$ or less.

5 Claims, No Drawings

SILVER OXIDE POWDER FOR ALKALINE BATTERY AND METHOD OF PRODUCING THE SAME

CROSS-REFERENCE TO RELATED APPLICATIONS

This application is a Continuation-In-Part of PCT/JP2004/001463 filed Feb. 12, 2004. This PCT application was not in English as published under PCT Article 21(2).

TECHNICAL FIELD

This invention relates to a positive electrode material for a silver oxide battery, namely, a silver oxide powder for an alkaline battery, and a method of producing the same.

BACKGROUND ART

The silver oxide battery is a voltaic cell that uses silver oxide ($Ag_2O$) as the positive electrode material (cathode active material) and zinc as the negative electrode active material (anode active material). Owing to its ability to maintain a constant voltage over a prolonged period, this battery is used mainly as a power source for driving quartz-oscillator watches and clocks, the integrated circuitry of game machines, and the like.

The silver oxide battery is generally structured as follows. The silver oxide powder serving as the active material of the battery positive electrode is blended with at least one member selected from among $MnO_2$, NiOOH, CoOOH, $AgNiO_2$, $AgCoO_2$, CaO, MnO, HgO, CdO, CdS, polytetrafluoroethylene, metallic silver, AgO and carbon. The blend, called the "positive electrode compound," is generally formed into a circular shape (the "compacted compound body") using a die press.

The compacted compound body is installed in a can (positive electrode can) made of stainless steel or a stainless steel laminate, a separator is mounted on the compacted compound on the open side of the can, another can is charged with negative electrode zinc paste (negative electrode can), and the positive and negative electrode cans are joined. A nylon ring is generally used as the insulating sealing material interposed between the positive and negative electrode cans. NaOH, KOH or a mixture thereof is used as the electrolyte. The electrolyte is usually injected after the compacted compound body is installed in the positive electrode can. Electrolyte is also sometimes added to the negative electrode zinc paste. The assembled battery is pressure-cured to facilitate permeation of the electrolyte into the compacted compound body.

Among the properties required of a silver oxide battery, the most important is considered to be long service life, for example, the ability to hold up under use for five or more years. The battery is required to possess properties that do not change even under high-temperatures or during storage at normal temperature for several years. In actuality, however, silver oxide ($Ag_2O$) is unstable in an electrolyte. As a result, cases may arise in which self-discharge occurs because the $Ag_2O$ dissolves in an alkaline solution and the dissolved Ag ions reach the Zn negative electrode or because Ag is precipitated owing to a decomposition reaction of the $Ag_2O$ itself.

A technique has been developed for preventing such self-discharge by interposing cellophane tape between the positive electrode and negative electrode so that dissolved Ag ions are caught by the cellophane and prevented from dispersing to the negative electrode. Another practice adopted is to further install a polypropylene or PEGF film between the positive electrode and the cellophane, to establish a multilayer arrangement. Decline in the function of the cellophane owing to oxidation by the Ag ions is, however, unavoidable. Moreover, the extent to which the separator can be formed in multiple layers is limited by the limitation on the volume of the battery.

In light of this situation, positive electrode side solutions proposed include that taught by JP Sho59-167963A of adding Cd to the positive electrode compound so as to curb dissolution of silver, that taught by JP Sho55-133765A of adding zinc oxide to the $Ag_2O$, and that taught by JP Hei2-12762A of sandwiching the silver oxide positive electrode with a shaped body of mixed manganese dioxide and carbon.

PROBLEMS TO BE OVERCOME BY THE INVENTION

Although the foregoing various improvements on the separator side have been attempted to counteract self-discharge of the silver oxide battery, the method of adding Cd will be undesirable from now on owing to environmental concerns. The method of adding zinc oxide reduces battery capacity because the zinc oxide does not function as an active material, and the method of disposing a shaped body of mixed manganese dioxide and carbon between the positive electrode and separator may well complicate the battery manufacturing process and increases cost.

While these problems can be overcome by using for the positive electrode a silver oxide that is itself resistant to self-discharge, no such example has been reported. An object of the present invention is therefore to provide a battery silver oxide powder that is low in self-discharge.

DISCLOSURE OF THE INVENTION

The inventors carried out an extended study regarding the aforesaid problems. As a result, the inventors learned that since the dissolution rate of silver ion into the electrolyte is affected by the powder property of the silver oxide and the crystallinity of the silver oxide, it is possible by appropriately controlling these properties to obtain a silver oxide that is low in self-discharge and to improve the post-storage service capacity maintenance factor. In order to reduce the silver ion dissolution rate, it is particularly necessary to bring the specific surface area, primary particle diameter and crystal grain diameter of the silver oxide powder into prescribed ranges. These factors are complexly interrelated and if any one of them is not satisfied, the improving effect becomes insufficient. Moreover, from the viewpoint of battery storability, not only is the silver ion dissolution rate into the electrolyte important, so is the reducing/decomposing reaction of silver oxide in the electrolyte, which makes it necessary for the silver oxide to be stable as an oxide also in the electrolyte.

Based on the facts found, the present invention provides an alkaline battery silver oxide powder that when a 5 g of its sample is soaked in a 50 cc of 50° C. KOH 40% aqueous solution for 24 hours, it experiences dissolution of Ag into the solution of 40 mg/L (milligram/liter) or less, and further provides an alkaline battery silver oxide powder that exhibits substantially no Ag peak by X-ray diffraction even after soaking in a 50° C. KOH 40% aqueous solution for 72 hours.

This alkaline battery silver oxide powder has a crystallite size calculated from the half value breadth of the (111) plane peak by powder X-ray diffraction of greater than 250 Angstrom and equal to or less than 1000 Angstrom, particle diameter such that the average diameter of secondary particles is equal to or greater than 1 μm and equal to or less than 500 μm and that of primary particles forming the secondary particles is equal to or greater than 0.1 μm and equal to or less than 10.0 μm, and specific surface area by the BET method of 5 m$^2$/g or less.

This invention provides an alkaline battery positive electrode shaped body formed by blending with said silver oxide powder at least one additive selected from the group consisting of $MnO_2$, NiOOH, CoOOH, $AgNiO_2$, $AgCoO_2$, CaO, MnO, HgO, CdO, CdS, polytetrafluoroethylene, metallic silver, AgO and carbon, plus provides an alkaline battery comprising a negative electrode active material, a positive electrode active material, an alkaline electrolyte, a separator and a can body, wherein the alkaline battery uses an alloy composed mainly of Zn as the negative electrode active material, NaOH, KOH or a mixture thereof as the electrolyte, and said silver oxide as the positive electrode active material.

PREFERRED EMBODIMENTS OF THE INVENTION

One feature of the silver oxide according to the present invention is low dissolution of Ag ions into the electrolyte and that when soaked in a 50° C. KOH 40% aqueous solution for 24 hours it experiences dissolution of Ag into the solution of 40 mg/L or less. When the amount of Ag ion dissolution exceeds this level, the rate at which the dissolved out Ag ions reach the Zn negative electrode increases and the rate of so-called self-discharge is also accelerated. Moreover, substantially no Ag peak by X-ray diffraction appears even after soaking in a 50° C. KOH 40% aqueous solution for 72 hours. In other words, no Ag precipitates from the silver oxide even after such soaking. This indicates stability in the electrolyte, whereby the post-storage service capacity maintenance factor of the battery becomes excellent.

This silver oxide powder exhibiting resistance to self-discharge and decomposition preferably has a crystallite size calculated from the half value breadth of the (111) plane peak by powder X-ray diffraction of greater than 250 Angstrom and equal to or less than 1000 Angstrom, particle diameter such that the average diameter of secondary particles is equal to or greater than 1 μm and equal to or less than 500 μm and that of primary particles forming the secondary particles is equal to or greater than 0.1 μm and equal to or less than 10.0 μm, and specific surface area by the BET method of 5 m$^2$/g or less.

When the crystallite size is not more than 250 Angstrom, reduction of silver oxide in the electrolyte proceeds readily, which is thought to be due to instability in the electrolyte. As a result, a crystallite size of greater than 250 Angstrom is required. However, a product with a crystallite size exceeding 1000 Angstrom is difficult to produce in actual practice, and even if one is obtained, its effect is saturated, so that the crystallite size is preferably greater than 250 Angstrom to 1000 Angstrom, more preferably greater than 270 Angstrom to 1000 Angstrom.

Regarding the particle diameter (average particle diameter) of the silver oxide, when the diameter of the secondary particles formed by assembled primary particles is less than 1 μm, the powder becomes hard to handle owing to high bulk and poor fluidity and, in addition, it becomes difficult to maintain a good post-storage service capacity maintenance factor. When the secondary particle diameter exceeds 500 μm, however, no further major effect on the post-storage service capacity maintenance factor can be expected. The secondary particle diameter is therefore preferable 1-500 μm, more preferably 1.5-500 μm, still more preferably 5-300 μm. When the diameter of the primary particles that form the secondary particles is less than 0.1 μm, stability in the electrolyte is degraded to undesirably make the silver oxide readily reducible. However, growth to larger than 10 μm requires a special reaction that increases cost. The primary particle diameter is therefore preferably about 0.1-10 μm, more preferably about 0.5-5 μm.

The value of the silver oxide specific surface area as measured by the BET method needs to be equal to or less than 5 m$^2$/g. and is preferably 4 m$^2$/g or less, more preferably 0.5 m$^2$/g or less. When the specific surface area exceeds 5 m$^2$/g, the dissolution rate of silver ions into the electrolyte become high and reduction to Ag proceeds readily, making in impossible to achieve the object of the present invention.

The interrelation among the powder properties, crystallite size, rate of Ag ion dissolution into the electrolyte and decomposition resistance of the silver oxide is complex and the complicated relationship among these factors makes them difficult to explain individually. However, what it boils down to is that a silver oxide powder with large primary particle diameter, small specific surface area and large crystallite size has good storage properties and a battery with good storage properties cannot be obtained if any one of these properties is not satisfied.

The silver oxide according to the present invention can be produced through the following steps. Steps 3 and 4 are sometimes repeated two or more times in order to reduce impurities.

1. Step of forming slurry by carrying out a neutralizing reaction between silver salt and alkali in water (called "neutralizing step").

2. Step of separating solid particle component from the slurry (solid-liquid separating step).

3. Step of washing the solid particle component (washing step).

4. Step of dewatering or decomposing the solid particle component at a temperature of 100° C. or higher (heat treating step).

Neutralizing Step

In the neutralizing step an inorganic acid salt of Ag and an alkali compound are reacted in water under appropriate stirring. Reaction methods available for this include the method of adding the alkali to the silver salt, the method of adding the Ag salt to an aqueous solution of the alkali and the method of simultaneously adding the Ag salt and alkali to water. For battery silver oxide, the method of adding the alkali to the Ag salt or the method of simultaneously adding the Ag salt and alkali to water is preferable. The Ag salt is preferably sulfate or nitrate of silver, while as the alkali compound there can be used NaOH, KOH, $NH_3$, $(NH_3)_2CO_3$, $Na_2CO_3$, $Na_2SO_4$, $(NH_3)_2SO_4$ or the like.

It is no exaggeration to say that the number of processes available for synthesizing silver oxide is almost infinite if the combination of conditions includes even the fine details, so that it is difficult to derive a single unique production method for obtaining a suitable silver oxide for batteries. As particularly important basic factors there can be mentioned the amount of silver ions dissolved in the reaction mother liquor, the pulp concentration and the silver oxide generation rate. The results of tests conducted by the inventors showed that for obtaining the silver oxide according to the present invention, the amount of dissolved silver ions (silver ion concentration) is preferably equal to or greater than 10 mg/L, more preferably equal to or greater than 15 mg/L. Although solubility is generally controlled by means reaction temperature and pH, silver solubility can be further enhanced by using a complexing agent. Still more preferably, it is desirable for the silver oxide generation rate, i.e., the period from the start of neutralization and the filtering step, to be 30 min or longer.

A complexing agent can be made co-present at the time of reacting the inorganic acid salt of Ag and the alkali. Silver oxide is precipitated from the liquor by this neutralizing reaction, but the primary particle diameter, secondary particle diameter, specific surface area and crystallinity of the precipitant are affected by such factors as the solubility of the Ag in the reaction liquor, pulp concentration and convection rate owing to stirring or the like. These factors therefore have to be suitably controlled to produce silver oxide whose particle diameter and specific surface area are in accordance with the present invention. Factors affecting particle growth are reaction temperature, reaction liquor concentration, rate of salt and/or alkali addition, and ripening period after addition, and these need to be controlled so as to achieve a particle diameter according to the present invention. For this control, the pH of the reaction liquor should be equal to or higher than 5 and equal to or lower than 11. When the pH exceeds 11, the secondary particle diameter becomes small owing to low Ag solubility, and when the pH is lower than 5, yield is poor owing to excessively high Ag solubility. At this time, primary particle diameter, secondary particle diameter and crystallinity can also be controlled by making a dispersant, complexing agent, coagulant or the like co-present in the reaction liquor. Although particle growth proceeds more readily with increasing reaction temperature, a reaction temperature of 100° C. or lower is preferable because special equipment is necessary at a high temperature. At 10° C. or lower, however, the crystal grains become small and the Ag concentration in the mother liquor becomes low, making it difficult to obtain a silver oxide that is good in storage properties and self-discharge properties. More specifically, when reacting the inorganic acid salt of Ag and alkali compound in water, it is preferable to regulate the reaction temperature, reactant concentration, reaction liquor pH, reactant feed rate, post-reaction ripening period, ripening temperature and the like so as to maintain the amount of silver ions dissolved in the reaction mother liquor, i.e., the Ag concentration of the reaction liquor, at 10 mg/L or greater, preferably at 15 mg/L or greater. As indicated by the examples set out later, when the Ag concentration of the reaction liquor is less than 10 mg/L, it is difficult to consistently produce silver oxide powder having a crystal grain diameter of greater than 250 Angstrom and therefore difficult to obtain a silver oxide that is excellent in storage properties and self-discharge properties. In order to make the Ag concentration of the reaction liquor 10 mg/L or greater, it is preferable not only to regulate the pH of the reaction liquor to 5-11 and maintain the reaction temperature at 10-100° C. as mentioned above but also to make the alkali concentration (amount of alkali-nitrate ions or sulfate ions) 2 mole/L or less. Further, the ripening is conducted in the temperature range of 20-100° C., preferably on the high side of this range, for 10 min or more.

The pulp concentration has a large effect mainly on the aggregated diameter of the primary particles and by extension on the secondary particle diameter. The growth of the secondary particles is accompanied by repeated collisions among the primary particles and among the secondary particles, so that increasing the frequency of collision increases the secondary particle diameter. In light of these facts, the pulp concentration is preferably made 100 g/L or greater to less than 450 g/L.

Solid-Liquid Separation and Washing Steps

Solid-liquid separation can be implemented by, for example, the filter press method or spin drying. Pure water is preferably used for washing. Washing needs to be conducted for so long as the electrical conductivity of the washing filtrate takes a prescribed value. The reduction and dissolution behavior of the silver during battery storage not only is affected by the aforesaid powder properties but also tends to be affected by impurities. If salts originating in the starting materials remain at the washing step, they become a cause of self-discharge in the battery. Since the effect of nitrate ions and sulfate ions is particularly large, washing is preferably conducted until the total impurity content becomes 0.02% or less, more preferably 0.01% or less. When sulfate ion and/or nitrate ion content has been reduced to 0.02% or less, preferably 0.01% or less, the silver oxide is outstanding in discharge performance after storage.

The silver oxide obtained from the neutralizing step needs to be thoroughly washed in the washing step. The washing step is aimed at enhancing the silver oxide content and at removing nitrate ions or sulfate ions originating in the starting materials. In the examples set out later, nitrate ions are measured as impurity originating in the starting material because silver nitrate is used as the silver salt, but sulfate ions can be considered to have a similar effect. It is presumed that ions capable of assuming two or more valences also have a similar effect.

Heat Treating Step

The purpose in heat-treating the cake after washing is to remove moisture from the cake and decompose remaining Ag salt. The heat treatment is preferably conducted at a temperature of 50° C. or higher and 400° C. or lower. At a temperature higher than 400° C., the silver oxide is decomposed to precipitate metallic silver, which reduces the battery capacity. At lower than 50° C., efficiency is poor owing to slow drying rate. The heat treatment is preferably conducted in an inert gas atmosphere, in a vacuum or in air removed of $CO_2$, so that atmospheric $CO_2$ does not react with the silver oxide. For obtaining high-purity silver oxide, it is possible to follow the heat treatment at a temperature higher than 50° C. and not higher than 400° C. with another washing step and heat treatment at a temperature of 300° C. or lower.

The silver oxide powder in accordance with the present invention obtained in this manner can be used as a positive electrode active material in the same manner as in the conventional silver oxide battery. Specifically, it is possible, in an alkaline battery comprising a negative electrode active material, a positive electrode active material, an alkaline electrolyte, a separator and a can body, to use an alloy composed mainly of Zn as the negative electrode active material, NaOH, KOH or a mixture thereof as the electrolyte, and the silver oxide in accordance with the present invention as the positive electrode active material. In this case, as in the case of the conventional silver oxide battery, it is possible to blend the silver oxide powder according to the present invention with at least one additive selected from the group consisting of $MnO_2$, NiOOH, CoOOH, $AgNiO_2$, $AgCoO_2$, CaO, MnO, HgO, CdO, CdS, polytetrafluoroethylene, metallic silver, AgO and carbon, form the result into a compacted compound body, and use the compacted compound body as the positive electrode.

EXAMPLES

Prior to the explanation of examples, an explanation will be given regarding the methods used for obtaining the measured values in the examples.

(1) Secondary Particle Diameter Measurement

Silver oxide dispersed in a 0.2% aqueous solution of sodium hexametaphosphate under exposure to an ultrasonic wave was measured for volume-based average particle diameter using a laser particle size analyzer (Microtrac HRA). The average diameter of particles larger than 100 μm was calculated from mesh diameter. Other methods available for the measurement include ones using a scanning electron micrograph or HELLOS particle size distribution.

(2) Primary Particle Diameter Measurement

The average value was calculated from the vertical and lateral diameters of 100 particles measured in a scanning electron or transmission electron micrograph.

(3) Crystallite Size Measurement

Using X-rays belonging to the Kα1 emission of copper, the crystallite size (crystal grain diameter) was calculated from the half value breadth and position of the (111) diffraction peak in accordance with the equation:

$t=0.9\times\lambda/(B\times\cos\theta)$ t: Crystal grain diameter
λ: Wavelength of Kα1 radiation of Cu
B: Half value breadth
θ: Angle of diffraction (4) Measurement of Silver Ion Dissolution into KOH A 5 g specimen was added to 50 cc of KOH 40% aqueous solution, stirred for 5 minutes and, after the container was sealed, allowed to soak in the sealed state at 50° C. for 24 hours in a thermostatic oven. The result was filtered and the filtrate analyzed by ICP. When the filter paper was severely eaten away by the alkali, the solid-liquid was conducted by centrifugation.

(5) Ag Precipitation after Constant Temperature Storage in KOH

A 5 g specimen was added to 50 cc of KOH 40% aqueous solution, stirred for 5 minutes and, after the container was sealed, allowed to soak in the sealed state at 50° C. for 72 hours in a thermostatic oven. The result was filtered, the residue thoroughly washed with pure water, the dried powder subjected to X-ray diffraction, and the result examined for presence/absence of an Ag peak. When the filter paper was severely eaten away by the alkali, the solid-liquid was conducted by centrifugation. The following was taken into consideration regarding the Ag diffraction peak.

When X-ray diffraction is conducted on the cubic Ag crystal (ICDD No. 40783) using Cu Kα1 radiation, the diffraction peaks appear at, in order of decreasing intensity, 2θ=38.115°, 44.276° and 77.469°. In contrast, cubic $Ag_2O$ crystal (ICDD No. 411104) has diffraction peaks at, in order of decreasing intensity, 2θ=32.789°, 38.065° and 54.901°. Since the first peak of Ag and the second peak of $Ag_2O$ are thus at nearly the same position, they are difficult to distinguish. Therefore, for determining whether Ag peaks have appeared, it is important to ascertain in presence of the Ag second peak (2θ=44.27°). Owing to the fact that noise appearing in the background is also observed as peaks at this time, the following two rules were established as criteria for distinguishing the Ag second peak from noise peaks: the Ag second peak appearing at 2θ=44.276±0.1° must (1) have a half value breadth of 0.1° or greater and (2) have a peak intensity that is two or more times greater than any noise peak appearing at 2θ=44.276±0.2°.

(6) Calculation of Service Capacity Maintenance Factor

A beaker type battery was used for experimental purposes. The positive electrode was fabricated of a mixture obtained by mixing active material, PTFE (polytetrafluoroethylene) and carbon at a ratio of 0.8:0.1:0.1. The mixture was passed through a press to form a 0.2 mm thick sheet and a 15 mm diameter disk cut from the sheet was used as the positive electrode after being attached under 2t pressure to an Ni mesh to serve as a collector. The weight of the active material in the positive electrode was 0.15 mg. A Zn plate (w×h×t=20 mm×10 mm×1 mm) was used as the negative electrode and a Zn plate (w×h×t=5 mm×20 mm×1 mm) was used as a reference electrode. As the electrolyte was used 100 cc of 40% KOH solution. The service capacity maintenance factor (%) of the fabricated battery was calculated as the service capacity after standing for 96 hours in a thermo-hygrostat at 50° C. and 80% humidity relative to that before the storage expressed in percentage and this value was defined as an index. A higher service capacity maintenance factor indicates proportionally better powder storage properties. Service capacity maintenance factor (%)=100×post-storage service capacity (mAh/g)/pre-storage service capacity (mAh/g).

(7) Measurement of Ag Dissolution into Reaction Mother Liquor

Slurry sampled from the reaction vessel upon completion of neutralization was filtered and the filtrate was analyzed by ICP to determine the Ag concentration in it.

Example 1

An aqueous solution of silver nitrate prepared by diluting 6000 g of a silver nitrate solution of 35% Ag concentration with pure water up to 4 L was held at 90° C. while being added within 1.65 L of 48% NaOH over 120 min under stirring. The result was maintained at 90° C. to conduct ripening with stirring, whereafter a slurry was filtered off and thoroughly washed with pure water to obtain a cake. The obtained cake was dried and crushed to afford a silver oxide powder. The powder properties, storage properties and discharge performance of the obtained silver oxide powder were examined. The results are shown in Table 1. The Ag ion content of the reaction mother liquor was 18 mg/L.

Example 2

A silver nitrate solution of 35% Ag concentration, 600 g, was diluted with pure water up to 0.8 L. A separately prepared 50° C. aqueous alkali solution, 1.8 L, was regulated to an NaOH content expressed in mole concentration of 0.6 mole/L. Into this alkali solution, above silver nitrate aqueous solution and 48% NaOH aqueous solution were simultaneously added to obtain a neutral precipitate. The amount of 48% NaOH aqueous solution added at this time was regulated to maintain the NaOH in the vessel constantly at 0.6 mole/L taking into account the portion of the total amount of NaOH initially present in the vessel consumed to neutralize the increase in $NO_3^-$ ions caused by addition of the aforesaid salt. The obtained slurry was filtered off and thoroughly washed with pure water to obtain a cake. The obtained cake was dried and crushed to afford a silver oxide powder. The powder properties, storage properties and discharge performance of the obtained silver oxide powder were examined. The results are shown in Table 1. The Ag ion content of the reaction mother liquor was 14 mg/L.

Example 3

A silver nitrate solution of 35% Ag concentration, 600 g, was diluted with pure water up to 0.8 L. A separately prepared 20° C. aqueous alkali solution, 1.8 L, was regulated to an NaOH content expressed in mole concentration of 0.02 mole/L. Into this alkali solution, the silver nitrate aqueous solution and 48% NaOH aqueous solution were added to obtain a neutral precipitate. The amount of 48% NaOH aqueous solution added at this time was regulated to maintain the NaOH in the vessel constantly at 0.02 mole/L taking into account the portion of the total amount of NaOH initially present in the vessel consumed to neutralize the increase in $NO_3$— ions caused by addition of the aforesaid salt. The obtained slurry was filtered off and thoroughly washed with pure water to obtain a cake. The obtained cake was dried and crushed to afford a silver oxide powder. The powder properties, storage properties and discharge performance of the obtained silver oxide powder were examined. The results are shown in Table 1. The Ag ion content of the reaction mother liquor was 10 mg/L.

Example 4

A silver nitrate solution of 35% Ag concentration, 1715 g, was diluted with pure water up to 4.0 L. The nitrate solution was added with $NaHCO_3$ over a period of 40 min to make its final pH 6.0. The obtained slurry was filtered off and thoroughly washed with pure water to obtain a cake. The obtained cake was dried to afford a silver oxide powder. The powder properties, storage properties and discharge performance of the obtained silver oxide powder were examined. The results are shown in Table 1.

Example 5

Silver nitrate aqueous solution at an Ag concentration of 120 g/L and an aqueous solution containing 100 g/L of $NaHCO_3$ were simultaneously added to 3 L of an aqueous solution containing 100 g/L of sodium nitrate. The rate of silver nitrate addition was set at 40 mL/min and the rate of $NaHCO_3$ addition was regulated to make the pH of the liquor in the vessel 5.9. The obtained slurry was filtered off and thoroughly washed with pure water to obtain a cake. The obtained cake was dried to afford a silver oxide powder. The powder properties, storage properties and discharge performance of the obtained silver oxide powder were examined. The results are shown in Table 1.

Example 6

The silver oxide powder obtained in Example 4 was shaped, crushed and classified to obtain a silver oxide powder whose secondary particle diameter distribution was 70-300 µm and average secondary particle diameter was 150 µm. The powder properties, storage properties and discharge performance of the obtained silver oxide powder were examined. The results are shown in Table 1.

Example 7

A silver nitrate solution of 35% Ag concentration, 1715 g, was diluted with pure water up to 4.0 L. The nitrate solution was added with $NH_4HCO_3$ over a period of 40 min to makes its final pH 6.0. The obtained slurry was filtered off and thoroughly washed with pure water to obtain a cake. The obtained cake was dried to afford a silver oxide powder. The powder properties, storage properties and discharge performance of the obtained silver oxide powder were examined. The results are shown in Table 1.

Example 8

Silver nitrate aqueous solution at an Ag concentration of 120 g/L and an aqueous solution containing 100 g/L of $NaHCO_3$ were simultaneously added to 3 L of an aqueous solution containing ammonium nitrate at a concentration of 100 g/L. The rate of silver nitrate addition was set at 40 mL/min and the rate of $NaHCO_3$ addition was regulated to make the pH of the liquor in the vessel 5.9. The obtained slurry was filtered off and thoroughly washed with pure water to obtain a cake. The obtained cake was dried to afford a silver oxide powder. The powder properties, storage properties and discharge performance of the obtained silver oxide powder were examined. The results are shown in Table 1. The Ag ion content of the reaction mother liquor was 3200 mg/L.

Comparative Example I

A silver nitrate solution of 35% Ag concentration, 150 g, was diluted with pure water up to 0.8 L. A separately prepared 20° C. aqueous alkali solution, 1.8 L, was regulated to an NaOH content expressed in mole concentration of 0.02 mole/L. Into this alkali solution, the silver nitrate aqueous solution and 48% NaOH aqueous solution were simultaneously added to obtain a neutral precipitate. The amount of 48% NaOH aqueous solution added at this time was regulated to maintain the NaOH in the vessel constantly at 0.02 mole/L taking into account the portion of the total amount of NaOH initially present in the vessel consumed to neutralize the increase in $NO_3$— ions caused by addition of the aforesaid salt. The obtained slurry was filtered off and thoroughly washed with pure water to obtain a cake. The obtained cake was dried and crushed to afford a silver oxide powder. The powder properties, storage properties and discharge performance of the obtained silver oxide powder were examined. The results are shown in Table 1. The Ag ion content of the reaction mother liquor was 5 mg/L.

Comparative Example 2

A silver nitrate solution of 35% Ag concentration, 25 g, was diluted with pure water up to 0.8 L. Separately, 8.4 g of 48% of NaOH was weighed out and diluted with pure water up to 1 L. The silver nitrate solution was added to the NaOH solution (5° C.) under stirring. The obtained slurry was filtered off and thoroughly washed with pure water to obtain a cake. The obtained cake was dried and crushed to afford a silver oxide powder. The powder properties, storage properties and discharge performance of the obtained silver oxide powder were examined. The results are shown in Table 1. The Ag ion content of the reaction mother liquor was 1 mg/L.

TABLE 1

| | Powder properties | | | | Storage properties | | Discharge performance | | | Ag concentration of mother liquor mg/L |
|---|---|---|---|---|---|---|---|---|---|---|
| | Specific surface area m²/g | Primary particle diameter μm | Secondary particle diameter μm | Crystal grain diameter Å | X-ray Ag peak observed? | Dissolution mg/L | Pre-storage service capacity mAh/g | Post-storage service capacity mAh/g | Storage maintenance factor % | |
| Example 1 | 0.24 | 1 | 20. | 533 | No | 10 | 227 | 197 | 87 | 18 |
| Example 2 | 1.1 | 0.6 | 6.2 | 371 | No | 11 | 226 | 174 | 77 | 14 |
| Example 3 | 3.9 | 0.2 | 5.4 | 274 | No | 23 | 223 | 156 | 70 | 10 |
| Example 4 | 0.24 | 1 | 10. | 531 | No | 10 | 225 | 200 | 89 | |
| Example 5 | 0.20 | 5 | 150. | 652 | No | 7 | 225 | 203 | 90 | |
| Example 6 | 0.15 | 1 | 150. | 535 | No | 15 | 224 | 202 | 90 | |
| Example 7 | 0.20 | 1.5 | 13 | 599 | No | 8 | 224 | 205 | 92 | |
| Example 8 | 0.15 | 5 | 150. | 720 | No | 4 | 225 | 210 | 93 | 3200 |
| Comparative Example 1 | 7.2 | 0.2 | 1.3 | 250 | Yes | 41 | 220 | 95 | 43 | 5 |
| Comparative Example 2 | 7.5 | 0.1 | 1.2 | 223 | Yes | 45 | 215 | 41 | 19 | 1 |

As is clear from the results in Table 1, the silver oxides obtained in Comparative Examples 1 and 2, which had small crystal grain diameter (and small primary particle diameter in the case of Comparative Example 2) and large specific surface area, were inferior in storage properties and discharge performance, but the silver oxides obtained in Examples 1-8, which had large primary particle diameter, secondary particle diameter and crystal grain diameter all falling within the ranges stipulated by the present invention, and which additionally had small specific surface area, exhibited excellent storage properties and discharge performance. Moreover, the Ag concentration of the mother liquor was low in the Comparative Examples, while the Ag concentration of the mother liquor was high in the Examples.

Example 9

Example 2 was repeated except that, as shown in Table 2, the temperature of the aqueous alkali solution during neutralization was changed among 90° C., 75° C., 50° C. (same as Example 2) and 25° C. The powder properties, storage properties and discharge performances of the silver oxide powders obtained are shown in Table 2. The Ag concentrations of the mother liquor are also shown in Table 2.

Example 10

Example 2 was repeated except that the amount of alkali added during neutralization was varied. As shown in Table 3, the amount of added alkali was changed to change the difference obtained by subtracting the amount of NO₃— ions from the total amount of added NaOH (NaOH—NO₃) among 2 mole/L, 0.6 mole/L (Example 2) and 0.08 mole/L. The powder properties, storage properties and discharge performances of the silver oxide powders obtained are shown in Table 3. The Ag concentrations of the mother liquor are also shown in Table 3.

Example 11

Example 2 was repeated except that the temperature was increased to 90° C. after completion of the neutralizing reaction and ripening was conducted for a prescribed period at that temperature. As shown in Table 4, the ripening period at 90° C. was set at 0 hour (Example 2), 0.5 hour, 3 hours and 12 hours. The powder properties, storage properties and discharge performances of the silver oxide powders obtained are shown in Table 4.

Example 12

Example 3 was repeated except that, as shown in Table 5, the temperature of the aqueous alkali solution during neutralization was changed among 10° C., 20° C., (same as Example 3), 40° C. and 60° C. The powder properties, storage properties and discharge performances of the silver oxide powders obtained are shown in Table 5. The Ag concentrations of the mother liquor are also shown in Table 5.

Example 13

Example 4 was repeated except that different amounts of washing water were used at the time of washing the filtered-off slurry obtained with pure water. The amounts of washing water used were as shown in Table 6. After each washing, the conductivity of the filtrate was measured. The washing was done using 20° C. ion-exchanged water whose conductivity at 20° C. before washing was 0.08 mS/m. The nitrate ion concentration of the silver oxide after washing was also measured. The measured values and the discharge performances (maintenance factors) of the silver oxide powders are shown in Table 6.

TABLE 2

| | | Powder properties | | | | Discharge performance | | | Ag |
|---|---|---|---|---|---|---|---|---|---|
| | | Specific | Primary | Secondary | Crystal | Storage properties | | Pre-storage | Post-storage | Storage | concentration |
| No. | Neutralization temperature °C. | surface area m²/.g | particle diameter μm | particle diameter μm | grain diameter Å | X-ray Ag peak observed? | Dissolution mg/L | service capacity mAh/g | service capacity mAh/g | maintenance factor % | of mother liquor mg/L |
|---|---|---|---|---|---|---|---|---|---|---|---|
| 1 | 90 | 0.22 | 1.5 | 15. | 603 | No | 9 | 225 | 200 | 89 | 23 |
| 2 | 75 | 0.4 | 1.0 | 13. | 550 | No | 9 | 227 | 195 | 86 | 15 |
| 3 | 50 | 1.1 | 0.6 | 6.2 | 371 | No | 11 | 226 | 174 | 77 | 14 |
| 4 | 25 | 2.2 | 0.2 | 4.5. | 300 | No | 25 | 225 | 165 | 73 | 20 |

TABLE 3

| | | Powder properties | | | | Discharge performance | | | Ag |
|---|---|---|---|---|---|---|---|---|---|---|---|
| | Amount of | Specific | Primary | Secondary | Crystal | Storage properties | | Pre-storage | Post-storage | Storage | concentration |
| No. | added alkali NaOH—NO₃ (mole/L) | surface area m²/.g | particle diameter μm | particle diameter μm | grain diameter Å | X-ray Ag peak observed? | Dissolution mg/L | service capacity mAh/g | service capacity mAh/g | maintenance factor % | of mother liquor mg/L |
|---|---|---|---|---|---|---|---|---|---|---|---|
| 1 | 2 | 1.3 | 0.6 | 5 | 338 | No | 19 | 223 | 170 | 76 | 11 |
| 2 | 0.6 | 1.1 | 0.6 | 6.2 | 371 | No | 11 | 226 | 174 | 77 | 14 |
| 3 | 0.08 | 0.8 | 0.8 | 9.3 | 446 | No | 8 | 225 | 190 | 84 | 18 |

TABLE 4

| | | Powder properties | | | | Discharge performance | | | |
|---|---|---|---|---|---|---|---|---|---|---|
| | Ripening | Specific | Primary | Secondary | Crystal | Storage properties | | Pre-storage | Post-storage | Storage |
| No. | period (Hr) | surface area m²/.g | particle diameter μm | particle diameter μm | grain diameter Å | X-ray Ag peak observed? | Dissolution mg/L | service capacity mAh/g | service capacity mAh/g | maintenance factor % |
|---|---|---|---|---|---|---|---|---|---|---|
| 1 | 0 | 1.1 | 0.6 | 6.2. | 371 | No | 11 | 226 | 174 | 77 |
| 2 | 0.5 | 0.8 | 0.7 | 6.5. | 365 | No | 10 | 225 | 180 | 80 |
| 3 | 3.0 | 0.3 | 0.7 | 9.8 | 382 | No | 8 | 224 | 182 | 81 |
| 4 | 12.0 | 0.2 | 1.0 | 12 | 400 | No | 6 | 225 | 200 | 89 |

TABLE 5

| | | Powder properties | | | | Discharge performance | | | Ag |
|---|---|---|---|---|---|---|---|---|---|---|---|
| | | Specific | Primary | Secondary | Crystal | Storage properties | | Pre-storage | Post-storage | Storage | concentration |
| No. | Neutralization temperature °C. | surface area m²/.g | particle diameter μm | particle diameter μm | grain diameter Å | X-ray Ag peak observed? | Dissolution mg/L | service capacity mAh/g | service capacity mAh/g | maintenance factor % | of mother liquor mg/L |
|---|---|---|---|---|---|---|---|---|---|---|---|
| 1 | 10 | 4.1 | 0.2 | 5.5 | 250 | No | 35 | 223 | 142 | 64 | 6 |
| 2 | 25 | 3.9 | 0.2 | 5.4 | 274 | No | 23 | 223 | 156 | 70 | 10 |
| 3 | 40 | 2.1 | 0.5 | 8.9 | 305 | No | 18 | 225 | 175 | 78 | 15 |
| 4 | 60 | 1.5 | 0.7 | 10.5 | 369 | No | 15 | 225 | 180 | 80 | 18 |

TABLE 6

| No | Amount of washing water (L) | Conductivity mS/m | Nitrate ion concentration mg/L | Storage maintenance factor (%) |
|---|---|---|---|---|
| 1 | 0.5 | 675 | 0.1 | 44 |
| 2 | 1.0 | 145 | 0.03 | 59 |
| 3 | 1.5 | 26.5 | 0.009 | 70 |
| 4 | 2.0 | 8.26 | 0.004 | 81 |
| 3 | 3.0 | 3.72 | 0.001 | 89 |
| 4 | 5.0 | 2.68 | <0.001 | 89 |

The correlation between neutralization temperature and mother liquor Ag concentration can be seen from the results in Tables 2 and 5. It will be noted that when the neutralization temperature was set at or above a prescribed value, the mother liquor Ag concentration increased, the specific surface area decreased, and the primary particle diameter, secondary particle diameter and crystal grain diameter assumed the desired sizes, whereby there was obtained a silver oxide powder excellent in storage properties and self-discharge properties.

From Table 3 it can be seen that the amount of alkali during neutralization also affected the silver oxide properties. Specifically, when the amount of alkali was excessive, the desired Ag concentration of the mother liquid was hard to achieve. From the results in Table 4, it can be seen that when ripening was conducted following the neutralizing reaction, the primary particle diameter, secondary particle diameter and crystal grain diameter became the desired sizes while the specific surface area decreased, so that there was obtained a silver oxide powder excellent in storage properties and self-discharge properties. From Table 6 it can be seen that when the slurry was thoroughly washed to remove nitrate ions, a silver oxide powder excellent in self-discharge property was obtained.

As explained in the foregoing, the silver oxide powder according to the present invention has a property of being resistant to self-discharge and, as such, enables constitution of a silver oxide battery excellent in storage properties.

The invention claimed is:

1. An alkaline battery comprising a negative electrode active material, a positive electrode active material, an alkaline electrolyte, a separator and a can body, which alkaline battery uses an alloy composed mainly of Zn as the negative electrode active material, an aqueous solution of NaOH, KOH or a mixture thereof as the electrolyte, and a silver oxide as the positive electrode active material, wherein the silver oxide powder is one whose crystallite size calculated from a half value breadth of the (111) plane peak by powder X-ray diffraction is greater than 250 Angstrom and equal to or less than 1000 Angstrom and whose total content of nitrate ions and sulfate ions is 0.01% or less, and that when a 5 g of its sample is soaked in 50 cc of 50° C. KOH 40% aqueous solution for 24 hours, it experiences dissolution of Ag into the solution of 40 mg/L or less.

2. An alkaline battery comprising a negative electrode active material, a positive electrode active material, an alkaline electrolyte, a separator and a can body, which alkaline battery uses an alloy composed mainly of Zn as the negative electrode active material, an aqueous solution of NaOH, KOH or a mixture thereof as the electrolyte, and a silver oxide powder as the positive electrode active material, wherein the silver oxide powder is one whose crystallite size calculated from a half value breadth of the (111) plane peak by powder X-ray diffraction is greater than 250 Angstrom and equal to or less than 1000 Angstrom and whose total content of nitrate ions and sulfate ions is 0.01% or less, and wherein substantially no Ag peak by X-ray diffraction is exhibited even after soaking in a 50° C. KOH 40% aqueous solution for 72 hours.

3. An alkaline battery comprising a negative electrode active material, a positive electrode active material, an alkaline electrolyte, a separator and a can body, which alkaline battery uses an alloy composed mainly of Zn as the negative electrode active material, an aqueous solution of NaOH, KOH or a mixture thereof as the electrolyte, and a silver oxide powder as the positive electrode active material, wherein the silver oxide powder is one whose crystallite size calculated from a half value breadth of the (111) plane peak by powder X-ray diffraction is greater than 250 Angstrom and equal to or less than 1000 Angstrom and whose total content of nitrate ions and sulfate ions is 0.01% or less, whose average diameter of secondary particles is equal to or greater than 1 µm and equal to or less than 500 µm, that of primary particles forming the secondary particles is equal to or greater than 0.1 µm and equal to or less than 10.0 µm, specific surface area by the BET method is 5 $m^2$/g or less, and when a 5 g of its sample is soaked in 50 cc of 50° C. KOH 40% aqueous solution for 24 hours, it experiences dissolution of Ag into the solution of 40 mg/L or less.

4. An alkaline battery silver oxide powder for use as a positive electrode active material of a silver oxide battery in which zinc is used as a negative electrode active material, wherein the silver oxide powder is one that when a 5 g of its sample is soaked in 50 cc of 50° C. KOH 40% aqueous solution for 24 hours, it experiences dissolution of Ag into the solution of 40 mg/L or less and whose crystallite size calculated from the half value breadth of the (111) plane peak by powder X-ray diffraction is greater than 250 Angstrom and equal to or less than 1000 Angstrom.

5. An alkaline battery silver oxide powder for use as a positive electrode active material of a silver oxide battery in which zinc is used as a negative electrode active material, wherein the silver oxide powder is one that when a 5 g of its sample is soaked in 50 cc of 50° C. KOH 40% aqueous solution for 24 hours, it experiences dissolution of Ag into the solution of 40 mg/L or less and whose crystallite size calculated from the half value breadth of the (111) plane peak by powder X-ray diffraction is greater than 250 Angstrom and equal to or less than 1000 Angstrom, and that the average diameter of secondary particles is equal to or greater than 1 µm and equal to or less than 500 µm, that of primary particles forming the secondary particles is equal to or greater than 0.1 µm and equal to or less than 10.0 µm, and specific surface area by the BET method is 5 $m^2$/g or less.

* * * * *